(No Model.)
J. W. STANLEY.
HAND CULTIVATOR.
No. 425,150.                  Patented Apr. 8, 1890.
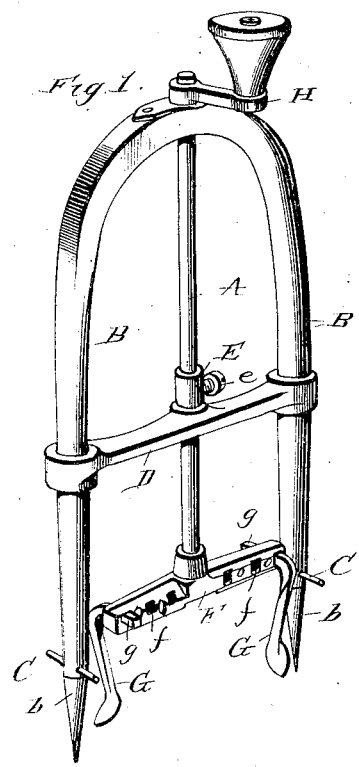
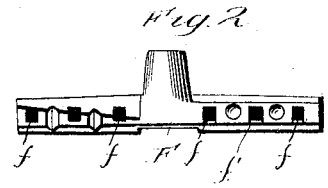     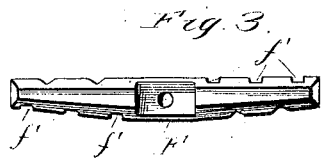
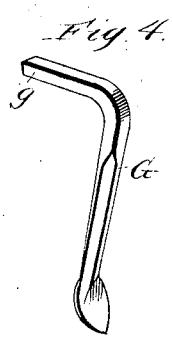
Witnesses
Inventor
James Wesley Stanley.
By his Attorney

UNITED STATES PATENT OFFICE.

JAMES WESLEY STANLEY, OF PEMBERTON, FLORIDA.

HAND-CULTIVATOR.

SPECIFICATION forming part of Letters Patent No. 425,150, dated April 8, 1890.

Application filed June 13, 1889. Serial No. 314,099. (No model.)

*To all whom it may concern:*

Be it known that I, JAMES WESLEY STANLEY, a citizen of the United States, residing at Pemberton, in the county of Sumter and State of Florida, have invented certain new and useful Improvements in Hand-Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cultivators, and has for its object the provision of a hand cultivating-tool for working and trenching around a plant.

The improvement consists of a frame for spanning the plant and a shaft journaled in the frame and having cultivating-teeth at its lower end, the teeth being adjustable to and from the shaft or its prolongation to adapt the device for plants of different sizes.

The improvement further consists of the novel features which will be hereinafter more fully described and claimed, and which are shown in the annexed drawings, in which—

Figure 1 is a perspective view of a cultivating-tool embodying my invention. Fig. 2 is a side view of the cross-head. Fig. 3 is a bottom plan view of the cross-head. Fig. 4 is a perspective view of the cultivating-tooth.

The frame for supporting the shaft A is suitably constructed for the purpose, so that it will support the said shaft directly over the plant, and for simplicity and economy is of an inverted-U shape, the ends of the vertical branches B being pointed to penetrate the soil to give steadiness to the tool when in operation. For lightness and cheapness the frame is composed of wood, which is bent in the form shown, the ends being provided with metallic points b. The pins C, passed transversely through the lower ends of the vertical branches B, serve to limit the depth of penetration of the points b to steady the frame, and as a rest for the foot when forcing the point b in the soil. The yoke or cross-bar D braces the frame, forms a lower bearing for the shaft A, and engages with the adjustable stop E on said shaft A to limit the downward movement of the said shaft. The adjustable stop E is a collar placed on the shaft and held thereon at the required place by set-screw e. The cross-head F on the lower end of the shaft A has a series of angular openings f, which are designed to receive the bent ends g of the cultivator-teeth G. The openings f are formed horizontally through the cross-head, so that the cultivator-teeth can have no vertical movement relative thereto. The notches f″ below the openings f receive the teeth G and brace them against lateral movement. The shaft A is rotated by suitable means, as the crank H.

The operation of the tool is as follows: The frame is placed over the plant, one branch B being on each side thereof, and is pressed down until the points b enter the soil sufficiently far to give steadiness to the device. The upper part of the frame is firmly held and the shaft rotated. As the shaft is rotated, the cultivator-teeth descend until the stop E strikes against the cross-bar D. The operation being complete, the tool is removed to another plant and the same operation repeated.

Having thus described my invention, what I claim, and desire to secure by Letters Patent, is—

1. A cultivator comprising the inverted-U-shaped frame, the yoke D, apertured at its ends and slipped on the vertical branches of the frame, the shaft journaled in the frame and yoke and having a cross-head at its lower end, which cross-head is provided with a series of horizontal openings, and the cultivator-shovels having their upper ends bent at right angles and adapted to be inserted in any of the openings, whereby the said shovels can be adjusted to and from each other, substantially as described.

2. The hereinbefore-described hand-cultivator, composed of the inverted-U-shaped frame of bent wood having metallic points and cross-pins, the yoke bracing the frame, the shaft journaled in the frame and the yoke, and having a crank at its upper end and a cross-head at its lower end, the adjustable stop on the shaft, and the cultivating-teeth adjustable on the cross-head, substantially as and for the purpose described.

In testimony whereof I affix my signature in presence of two witnesses.

JAMES WESLEY STANLEY.

Witnesses:
T. G. KNOTT,
D. C. HULL.